United States Patent [19]

Yamakage

[11] 4,440,530

[45] Apr. 3, 1984

[54] MACHINE TOOL WITH TOOL POSITION COMPENSATING APPARATUS AND CONTACT DETECTING APPARATUS

[75] Inventor: Tetsuro Yamakage, Anjo, Japan

[73] Assignee: Toyoda Koki Kabushiki Kaisha, Kariya, Japan

[21] Appl. No.: 301,208

[22] Filed: Sep. 11, 1981

[30] Foreign Application Priority Data

Sep. 11, 1980 [JP] Japan ................................ 55-126789

[51] Int. Cl.³ ........................ B23B 39/08; B23B 39/24
[52] U.S. Cl. ......................................... 408/3; 82/2 B;
408/13; 408/159; 408/173; 409/218; 409/208
[58] Field of Search ................ 408/2, 3, 13, 149, 158,
408/159, 173, 180, 178; 409/133, 218, 207, 208,
209, 214, 204, 206; 82/1.4, 1.5, 2 A, 2 B;
318/571; 364/474; 33/181 R, 181 AT

[56] References Cited

U.S. PATENT DOCUMENTS

3,715,167 2/1973 Ollearo ............................ 408/149

4,281,385 7/1981 Nakaso et al. ..................... 364/474

FOREIGN PATENT DOCUMENTS

47908 5/1979 U.S.S.R. ............................. 409/204

*Primary Examiner*—E. R. Kazenske
*Assistant Examiner*—Hien H. Phan
*Attorney, Agent, or Firm*—Oblon, Fisher, Spivak, McClelland & Maier

[57] ABSTRACT

A machine tool includes a tool holder supporting a cutting tool and receivable in a tool spindle. A device is provided in the tool holder to be engageable with a work table for adjusting the radial position of the cutting tool by utilizing the relative movement between the tool spindle and the work table. A contact detecting device detects the contact between the work table and the adjusting device. Relative movement between the tool spindle and the work table is caused to adjust the radial position of the cutting tool after the contact between the work table and the adjusting device is detected.

8 Claims, 4 Drawing Figures

MACHINE TOOL WITH TOOL POSITION COMPENSATING APPARATUS AND CONTACT DETECTING APPARATUS

BACKGROUND OF THE INVENTION

1. Field of the Invention

The present invention relates to a machine tool with a tool position compensating apparatus and a contact detecting apparatus.

2. Description of the Prior Art

In a conventional machine tool provided with a tool position compensating apparatus, a tool holder incorporates a movable engaging member extending externally therefrom and a tool position compensating mechanism for transmitting movement of the engaging member to a cutting tool to adjust the radial position of the cutting tool. In order to move the engaging member inwardly relative to the tool holder, a drive device is provided on a stationary part. This drive device has to be operated several times to adjust the tool position by a required amount. Accordingly, it takes a long time for a tool position compensation. Furthermore, in order to move the engaging member several times, a one-way clutch has to be incorporated in the tool position compensating mechanism, which disadvantageously results in a complicated construction.

SUMMARY OF THE INVENTION

Accordingly, one object of the present invention is to provide an improved machine tool capable of adjusting a radial position of the cutting tool by utilizing a relative movement between a tool spindle and a work table.

Another object of the present invention is to provide an improved machine tool of the character set forth above, wherein a tool position adjusting means is provided in a tool holder to be engageable with a work table and wherein relative movement between the tool spindle and the work table is caused to adjust the radial position of the cutting tool after contact between the work table and the adjusting means is detected.

Briefly, according to the present invention, these and other objects are achieved by providing a machine tool, as mentioned below. A work table is mounted on a machine body for mounting thereon a workpiece to be machined. A spindle head is mounted on the machine body and rotatably supports a tool spindle. A servomotor is provided for effecting relative movement between the work table and the tool spindle. A feed control means is connected to the servomotor for controlling the servomotor in accordance with feed pulses and axis designation signals. A cutting tool is supported on a tool holder receivable in the spindle. A means is provided in the tool holder and engageable with the work table for adjusting a radial position of the cutting tool by utilizing relative movement between the work table and the tool spindle. A means is provided for detecting contact between the work table and the adjusting means. A control means is responsive to the detecting means for causing the feed control means to effect relative movement between the work table and the tool spindle to adjust the radial position of the cutting tool.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
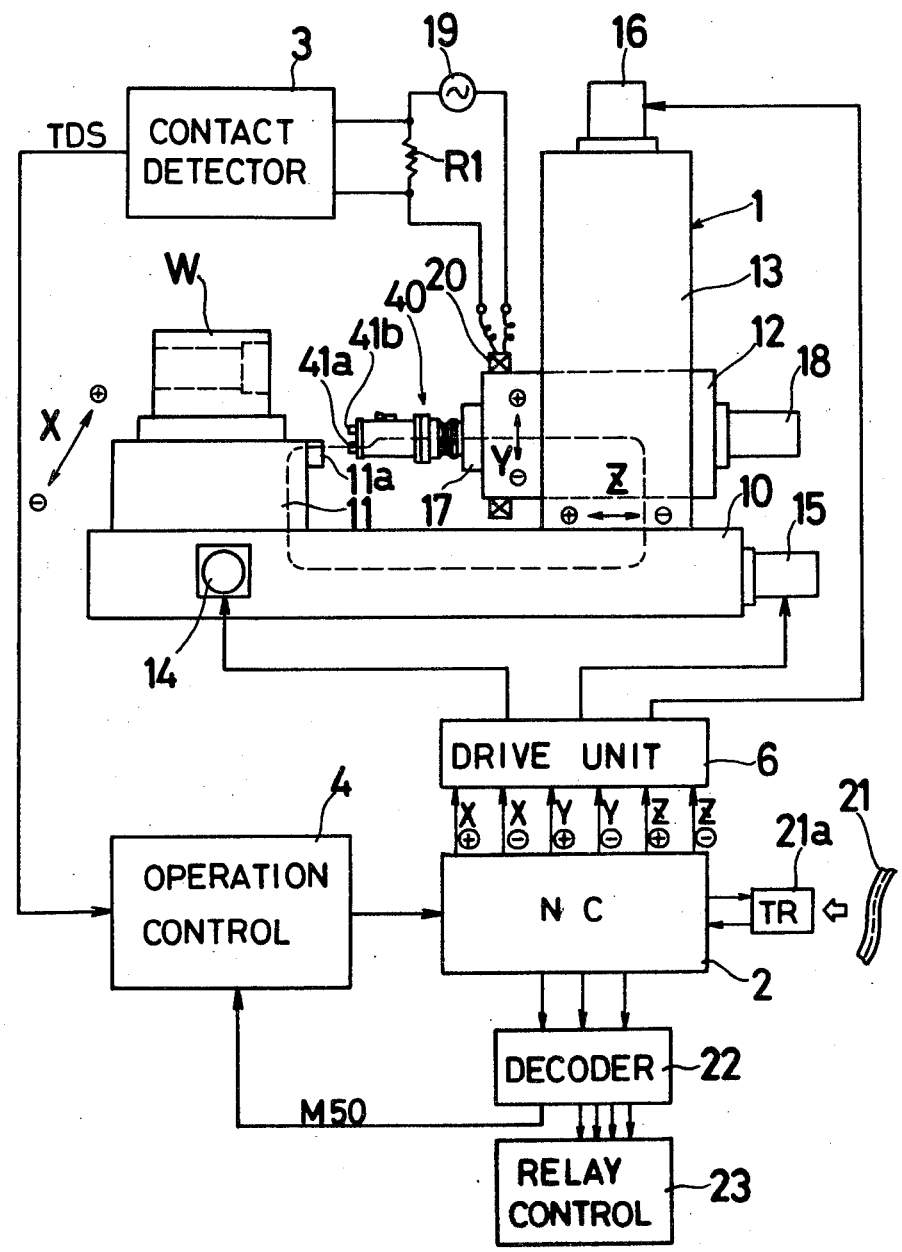
FIG. 1 is a schematic illustration of a machine tool with a tool position compensating apparatus and a contact detecting apparatus according to the present invention.

Referring now to the drawings, wherein like reference numerals or characters refer to identical or corresponding parts through the several views, and more particularly to FIG. 1, there is shown a machine tool according to the present invention, which comprises a machine body 1, a numerical control device 2, a contact detecting circuit 3, and an operation control device 4.

Reference numeral 10 indicates a bed of machine body 1, on which a work table 11 for mounting a workpiece W is mounted for sliding movement in a horizontal X-axis direction perpendicular to the plane of the Figure. A column 13 is mounted on bed 10 for sliding movement in a horizontal Z-axis direction orthogonal to the X-axis direction. A spindle head 12 is, in turn, mounted on column 13 for sliding movement in a vertical Y-axis direction. Work table 11 is connected to a servomotor 14 secured to bed 10 to provide movement in the X-axis direction. Column 13 is connected to a servomotor 15 secured to bed 10 to provide movement in the Z-axis direction. Spindle head 12 is connected to a servomotor 16 mounted on the top of column 13 to provide movement in the Y-axis direction. Servomotors 14, 15, and 16 are connected to a numerical control device 2 through a drive unit 6 to be rotated by distribution feed pulses generated from the numerical control device 2 so as to control relative movement between the workpiece W and the spindle head 12.

A tool spindle 17 is rotatably supported in the spindle head 12 and connected to a spindle motor 18 secured to the rear of spindle head 12 to be rotated thereby. In order to perform a machining operation on workpiece W, tool spindle 17 is adapted to receive a tool holder 40 incorporating therein a tool position compensating mechanism 48, which is described hereinafter, by means of an automatic tool change device, not whown. A toroidal coil 20 is mounted on the front end of the spindle head 12 and is connected to an AC power source 19 through a detection resistance R1. The coil 20 is wound around an iron core which surrounds the spindle 17. When one of the engaging members 41a and 41b, which are described hereinafter, of the tool holder 40 is brought into contact with an engaging surface 11a of the work table 11, an induced current is produced in a circuit including the work table 11, the bed 10, the column 13, the spindle head 12, the tool spindle 17, and the tool holder 40, as shown by the broken lines in FIG. 1, whereby an exciting current in the coil 20 is increased. This causes the voltage across the resistance R1 to increase. A contact detecting circuit 3 detects the contact between one of the engaging members 41a and 41b and the engaging surface 11a by detecting the increased voltage across the resistance R1. When detecting the contact, the contact detecting circuit 3 generates a contact detecting signal TDS.

The numerical control device 2 is of a conventional construction and serves to distribute feed pulses to the servomotors 14, 15 and 16 through the drive unit 6 to perform a machining operation on the workpiece W in accordance with numerical control information, which is recorded on a punched tape 21 readable by a tape reader 21a. The numerical control device 2 is provided with output terminals for outputting M-code data recorded on punched tape 21 and input terminals for receiving command signals from external devices.

The M-code data output from the numerical control device 2 are applied to a decoder 22 to be decoded thereby, and the decoder 22 outputs various auxiliary function commands in accordance with the M-code data. Many of the auxiliary function commands are applied to a relay control circuit 23 to control external equipment, such as, a valve for the supply of cutting oil. One of the auxiliary function commands M50 is applied to an operation control device 4 for instructing a tool position compensating operation. The operation control device 4 is constructed from a commercially available general purpose microcomputer which is programmed to control the tool position compensating operation in response to the auxiliary function command M50 by switching the numerical control device 2 into a manual mode and by applying an axis designation data and a pulse distribution command to the numerical control device 2.

Figure 2:
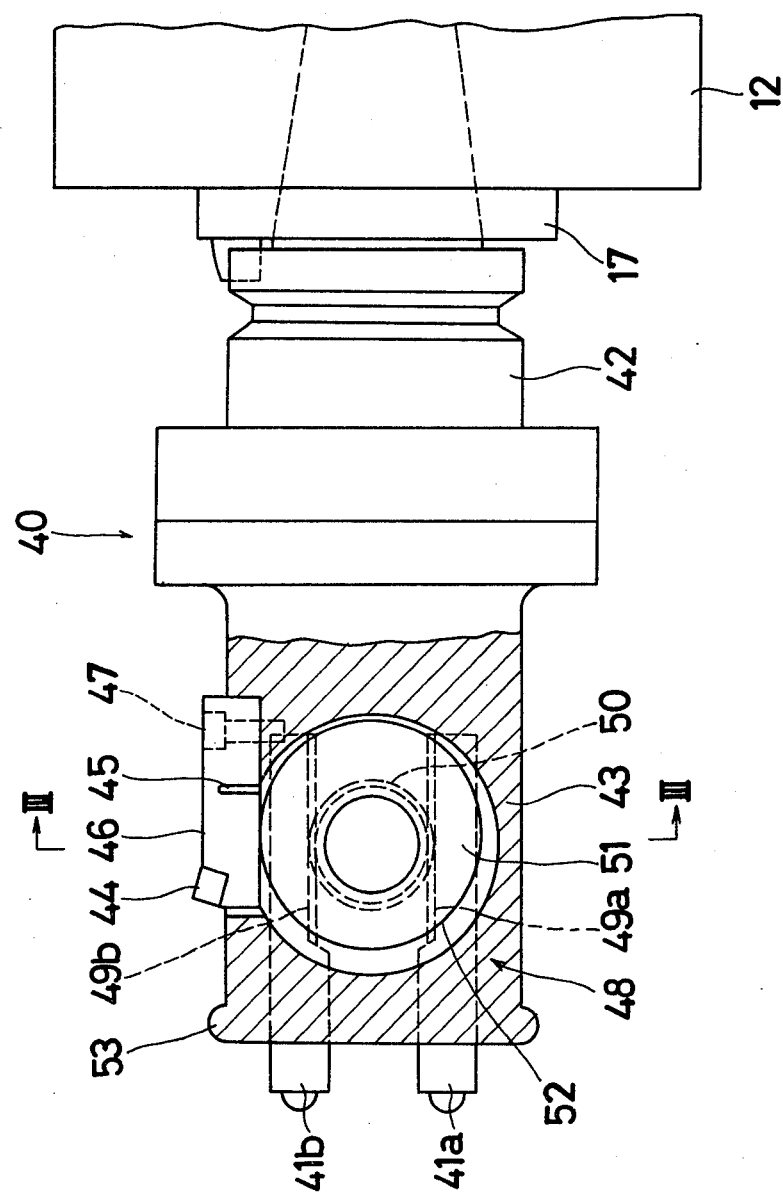
FIG. 2 is a fragmentary sectional view of a tool holder with the tool position compensating apparatus.
Figure 3:
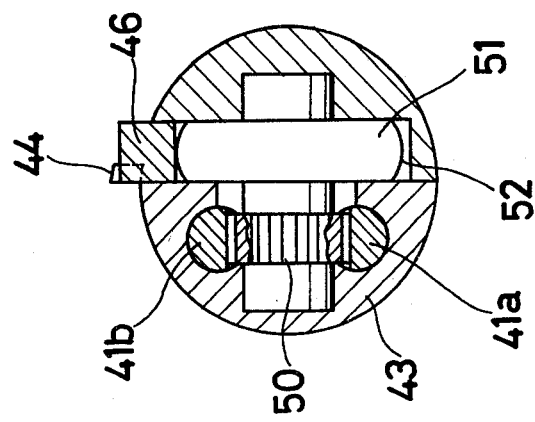
FIG. 3 is a sectional view taken along the lines III—III in FIG. 2.

Referring now to FIGS. 2 and 3, the tool holder 40 comprises a shank 42 to be inserted into a tapered bore of the spindle 17 and a tool mounting shell 43 flange-coupled to the shank 42 in coaxial alignment therewith. The shell 43 is formed at the external midportion thereof with a tool mounting seat on which one end of a cutting tool 46 having a cutting blade 44 at its other end is fixed by means of a bolt 47. The cutting tool 46 is formed at its mid-portion with a slot 45 to facilitate the flexing or bending of the cutting blade 44. The engaging members 41a and 41b are axially slidably received in the mounting shell 43 with a predetermined distance therebetween in the radial direction of the shell 43. One end of each of the engaging members 41a and 41b extends from the front end of the shell 43. The engaging members 41a and 41b are formed at the other ends with racks 49a and 49b, respectively, located in a faced relationship with each other. A pinion 50 engaging with both of the racks 49a and 49b is rotatably supported within the shell 43. An eccentric cam member 51 is integrally formed with the pinion 50 and has an external cam surface 52 engaging with the back of the cutting blade 44.

When the engaging member 41a is moved inwardly, the cam member 51 is rotated in the counterclockwise direction, as viewed in FIG. 2, by the rack and pinion mechanism 49 and 50, whereby the cutting blade 44 of the cutting tool 46 is extended in the radially outward direction through the external cam surface 52. On the other hand, when the engaging member 41b is moved inwardly, the cam member 51 is rotated in the clockwise direction, as viewed in FIG. 2, whereby the cutting blade 44 is retracted in the radially inward direction. Accordingly, the radial movement of the cutting blade 44 is controlled in proportion to the rotary angle of the cam member 51, that is, by the amount of movement of each of engaging members 41a and 41b.

The shell 43 is formed at its front end with a contact head 53 having a predetermined known diameter. When the contact head 53 is moved relatively within a machined bore of the workpiece W in the direction of the diameter of the machined bore, the diameter of the machined bore can be measured by counting the amount of movement of the work table 11 in the X-axis direction until a contact is detected between the contact head 53 and the machined bore. The wear amount of the cutting tool 46 can be obtained by calculating the difference between the measured diameter of the machined bore and the desired finished diameter.

The operation of the above-constructed machine tool will now be described.

The tool holder 40 for the boring operation is inserted into the tapered bore of the tool spindle 17 which is positioned at a predetermined angular position by means of the automatic tool change device. The tool spindle 17 is rotated by the motor 18 to perform a boring operation on the workpiece by means of the cutting tool 46. Upon completion of the boring operation, the contact head 53 is moved relatively in the machined bore to measure the diameter of the machined bore. The wear amount of the cutting blade 44 is calculated based upon the measured diameter of the machined bore, and the calculated wear amount is stored as a compensation amount in a register, not shown.

Figure 4:
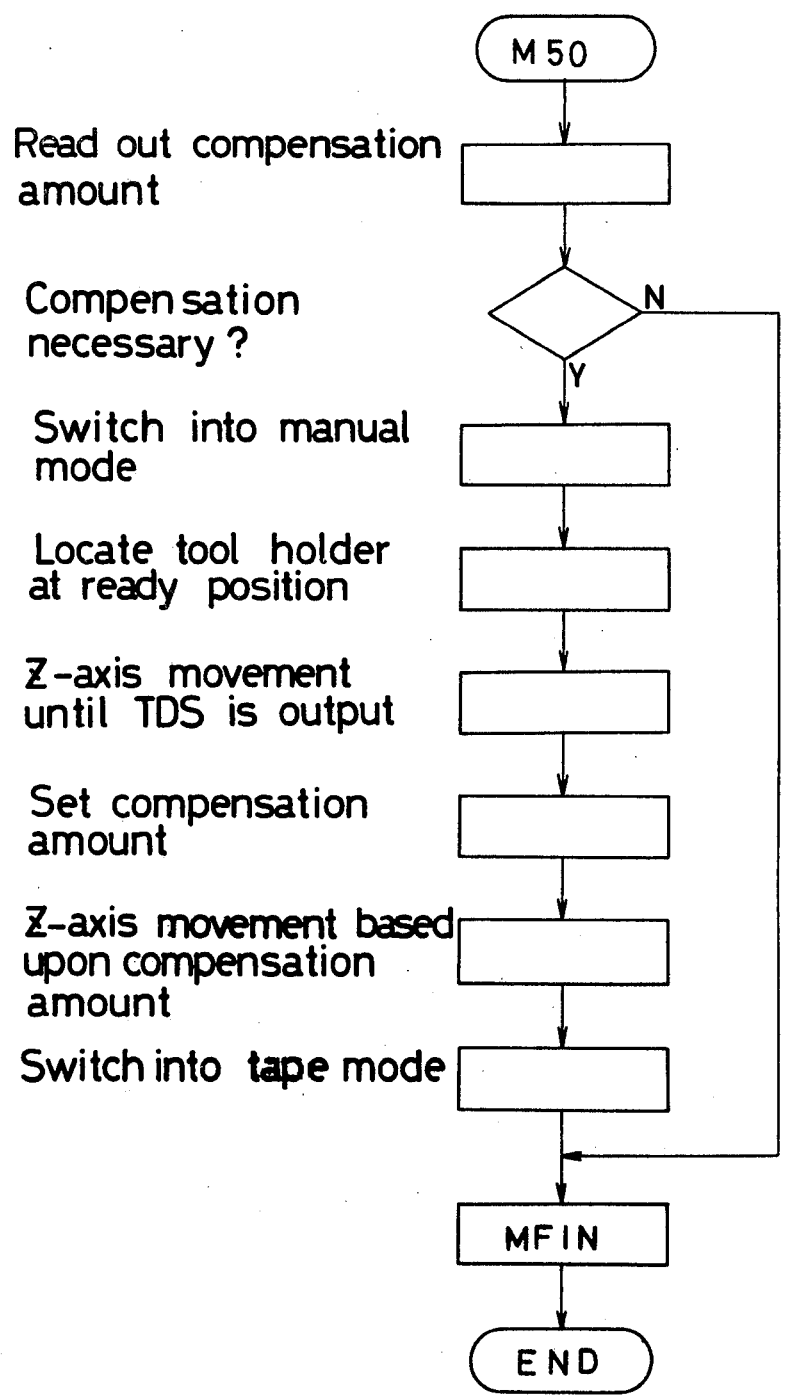
FIG. 4 illustrates a flow chart showing the tool compensating operation.

Subsequently, when the numerical control device 2 reads the auxiliary function command M50 for the instruction of the tool position compensating operation, this command is decoded by the decoder 22 and applied to the operation control device 4. The operation control device 4 performs the tool position compensating operation in response to this command in accordance with the flow chart shown in FIG. 4.

The operation control device 4 reads out the compensation amount of the cutting tool 46 stored in the register to judge whether it is necessary to perform a tool position compensating operation. When it is judged that the tool position compensation is not required, an auxiliary function completion signal MFIN is generated for another subsequent operation.

On the other hand, when it is judged that the tool position compensation is required, the operation control device 4 causes the numerical control device 2 to be switched into a manual mode. Then, the column 13, the spindle head 12 and the work table 11 are relatively moved to position the engaging member 41a in a faced relationship with the engaging surface 11a of the work table 11, as shown in FIG. 1. Subsequently, the column 13 is moved toward the work table 11. When the contact detecting circuit 3 generates a contact detecting signal TDS upon the contact of the engaging member 41a with the engaging surface 11a, movement of the column 13 is stopped. The compensating amount stored in the register is then set in a counter, not shown. Each time one feed pulse is distributed to the servomotor 15, the content of the counter is subtracted by one. The column 13 is moved toward the work table 11 until the content of the counter becomes zero. Accordingly, the engaging member 41a is moved inwardly relative to the tool holder 40 by an amount corresponding to the wear amount of the cutting tool 46, thereby adjusting the radial position of the cutting blade 44. When it is ascertained that the content of the counter has become zero, the tool holder 40 is returned to a programmed position and the numerical control device 2 is switched from the manual mode to a tape mode operation. Finally, the auxiliary function completion signal MFIN is generated to complete the tool position compensating operation.

In order to return the tool position compensating mechanism in the tool holder 40 into its original state, the other engaging member 41b is positioned in a faced relationship with the engaging surface 11a of the work table 11. The column 13 is moved toward the work table 11 until a contact between the engaging member 41b and the engaging surface 11a is detected by the contact detecting circuit 3. After detection of the contact, the column 13 is again moved toward the work table 11 to move the engaging member 41b inwardly relative to the tool holder 40 by an amount corresponding to a total compensating amount.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A machine tool comprising:
   a machine body;
   a work table mounted on said machine body for mounting thereon a workpiece to be machined;
   a spindle head mounted on said machine body;
   a tool spindle rotatably supported in said spindle head;
   feed means for effecting relative movements between said work table and said tool spindle;
   feed control means connected to said feed means for controlling said feed means in accordance with feed pulses and axis designation signals;
   a tool holder receivable in said tool spindle;
   a cutting tool supported on said tool holder;
   a pair of engaging members axially slidable received in said tool holder, one end of each of said engaging members extending from one end of said tool holder and being engageable with said work table;
   a compensating cam member rotatably supported in said tool holder to be rotated in one direction to extend said cutting tool outwardly in the radial direction when one of said engaging members is moved inwardly relative to said tool holder, and to be rotated in the other direction to retract said cutting tool inwardly in the radial direction when the other engaging member is moved inwardly relative to said tool holder;
   means for detecting contact between said work table and said engaging members and said compensating cam member and outputing a detection signal; and
   control means responsive to said detection signal output from said detecting means for causing said feed control means to effect relative movement between said work table and said tool spindle by an amount which is required to adjust the radial position of said cutting tool.

2. A machine tool as set forth in claim 1, wherein said adjusting means further comprises:
   a pair of racks formed on said pair of engaging member, respectively, in a faced relationship with each other; and
   a pinion rotatably supported in said tool holder to be engaged with both of said racks and drivingly connected with said cam member.

3. A machine tool as set forth in claim 1, wherein said work table is formed with an engaging surface engageable with each of said engaging members.

4. A machine tool comprising:
   a machine body;
   a work table mounted on said machine body for mounting thereon a workpiece to be machined;
   a spindle head mounted on said machine body;
   a tool spindle rotatably supported in said spindle head;
   a first feed means for effecting relative movement between said work table and said tool spindle in a first direction parallel to the axis of said tool spindle;
   a second feed means for effecting relative movement between said work table and said tool spindle in a second direction perpendicular to said first direction;
   a tool holder receivable in said tool spindle;
   a cutting tool supported on said tool holder;
   a measuring probe means provided on said tool holder at an axial position closer to said front end of said tool holder than said cutting tool and extending in a radial direction of said tool holder;
   adjusting means provided in said tool holder and outwardly protruding engaging means from a front end of said tool holder in said first direction, said engaging means being engageable with said work table for adjusting a radial position of said cutting tool by utilizing relative movement between said work table and said tool spindle in said first direction;
   detecting means for detecting contact between said work table and said engaging means and for detecting contact between said measuring probe means and said workpiece so as to output a detection signal; and
   feed control means responsive to a tool position adjusting command and said detection signal for controlling said first feed means to effect relative movement between said work table and said tool spindle in said first direction until said detection signal is output from said detecting means upon contact of said engaging means of said work table and then to effect relative movement between said work table and said tool spindle in said first direction by an amount which is required to adjust the radial position of said cutting tool and responsive to a measuring command and said detection signal for controlling said second feed means to effect relative movement between said work table and said tool spindle in said second direction so as to measure the distance between two diametrically opposed points at each of which said measuring probe means contacts an internal surface of a bore of said workpiece.

5. A machine tool as set forth in claim 4, wherein:
   said measuring probe means is circumferentially protruded from the outer circumferential surface of said tool holder and has a known diameter for enabling a diameter of said workpiece bore to be calculated based upon said known diameter and said measured distance between said two diametrically opposed points.

6. A machine tool as set forth in claim 4, wherein said adjusting means includes:
   a compensating cam member supported in said tool holder and rotatable by said engaging means when the same is moved relative to said tool holder in said first direction, said cam member being operatively connected with said cutting tool for extending said cutting tool outwardly in a radial direction when rotated in one direction and for retracting said cutting tool inwardly in the radial direction when rotated in the other direction.

7. A machine tool as set forth in claim 6, wherein said engaging means includes:
a pair of engaging members received in said tool holder in parallel relation with each other for respective sliding movements in said first direction and operatively connected to said cam member for rotating said cam member respectively in one direction and the other direction when each inwardly moved related to said tool holder upon engagement with said work table.

8. A machine tool as set forth in claim 7, wherein said adjusting means further includes:
a pair of racks respectively formed on said pair of engaging members in a faced relation with each others; and
a pinion supported in said tool holder for integral rotation with said cam member and meshing with said pair of racks to be rotated thereby.

* * * * *